United States Patent [19]
Gfeller

[11] 3,752,268
[45] Aug. 14, 1973

[54] BRAKING SYSTEM

[76] Inventor: Hans Gfeller, Haldenstrasse 65, Langenthal, Switzerland

[22] Filed: May 12, 1971

[21] Appl. No.: 143,690

[30] Foreign Application Priority Data
May 12, 1970 Switzerland.......................... 7005/70
Apr. 22, 1971 Switzerland.......................... 5850/71

[52] U.S. Cl........................... 188/181 A, 303/21 CG
[51] Int. Cl...:......................................... B60t 8/14
[58] Field of Search............................... 303/68–69, 61–63, 71, 21 AF, 21 CG, 21 F; 188/181 A

[56] References Cited
UNITED STATES PATENTS
3,473,850  10/1969  Lawrie ........................... 303/21 CG
3,527,504   9/1970  Chovings et al. .................. 303/21 A
3,549,209  12/1970  Moericke ........................ 303/21 CG
3,588,188   6/1971  Shattock ........................ 303/21 CG

*Primary Examiner*—Duane A. Reger
*Attorney*—Watson, Cole, Grindle & Watson

[57] ABSTRACT

The braking system for the braking of a part which is moving relative to another part, of the type including a brake cylinder which is charged with a fluid under pressure when the brake is off, and which pressure is relieved for braking purposes, the system comprising a pressure accumulator connected with the brake cylinder through a nonreturn valve to receive part of the fluid escaping from the cylinder, the accumulator containing a gas under pressure, the pressure of which gas determines the value of the initial braking force, and a deceleration regulator connected to the brake cylinder through a throttle valve, the deceleration regulator including a casing, a cut-off valve, a flywheel rotated by a spindle rotatably mounted in said casing and which is driven by an axle of the moving part so as to be capable of overrunning with respect to the spindle to cause the cut-off valve to operate to stop the passage of fluid into the regulator when a predetermined deceleration value is reached, and spring means opposing overrunning of the flywheel, the force of which spring determines the deceleration rate.

7 Claims, 9 Drawing Figures

Patented Aug. 14, 1973 3,752,268

INVENTOR.
HANS GFELLER
BY
WATSON COLE GRINDLE & WATSON
ATTORNEYS

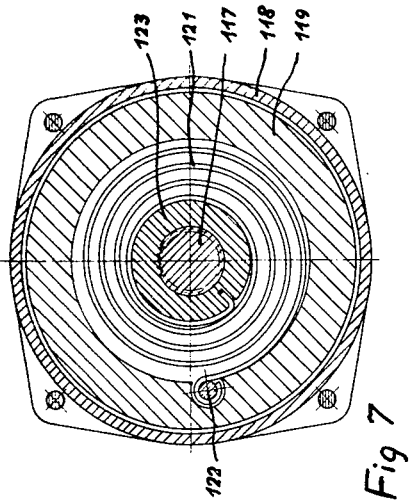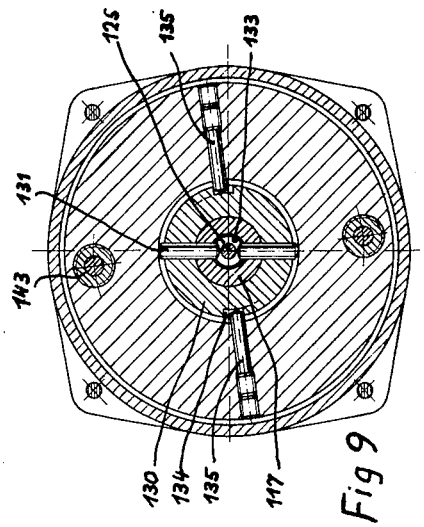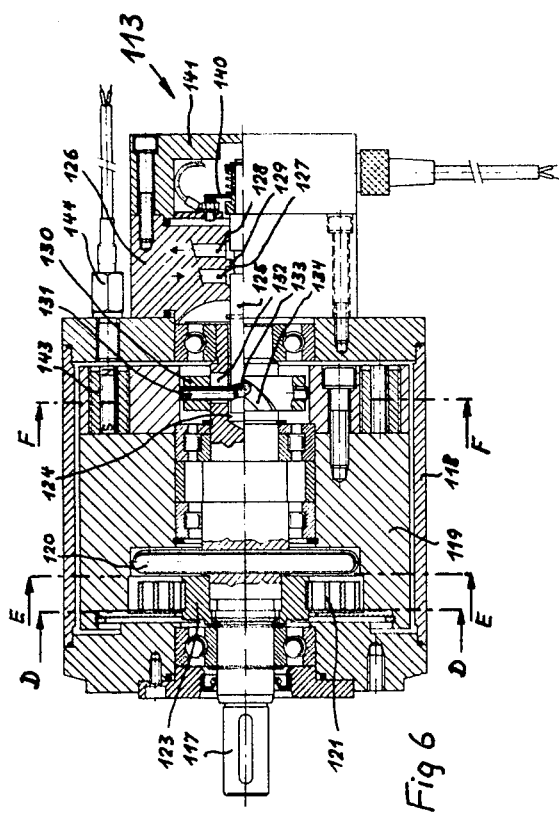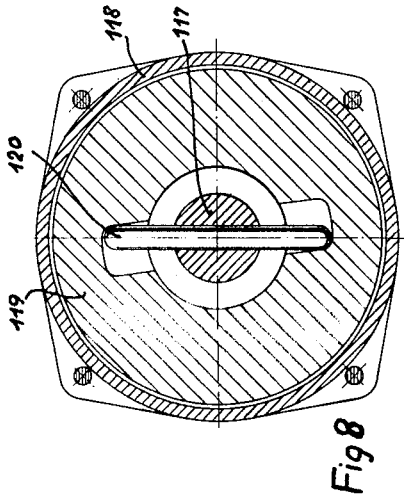

BRAKING SYSTEM

The invention relates to a braking system for the braking of parts endowed with relative motion, the system incorporating a cylinder which is charged with a fluid under pressure when the brake is off and which is relieved of pressure for braking purposes.

The disadvantage of existing braking systems of this type, which work hydraulically and are used for the braking of a vehicle, for example, is that the prescribed degree of deceleration obtainable by their means depends on the load carried by the vehicle, on the friction coefficient of the brake components and — when, for instance, a mountain railway vehicle is concerned — on the gradient momentum of the vehicle, the prescribed degree of deceleration representing the value which is still just permissible for braking without risk to the occupants of the vehicle, but which, if exceeded, might cause passengers to fall and injure themselves. With mountain railways in particular, the track gradient differs between particular stations and in the vicinity of the stations themselves, so that the fluctuations in gradient momentum have a varying effect as regards the achievement of the prescribed degree of deceleration, while the possibility of fluctuations in the passenger loading of the vehicle is another determining factor.

The purpose of the invention is to achieve a prescribed degree of deceleration of a vehicle, for example, by means of a braking system, independently of the load carried, the gradient momentum and the friction coefficient of the brake components. A braking system of the type described in the preamble, when modified to embody the principle of the invention, should therefore be characterised by the fact that, for regulation of the braking deceleration, the cylinder is connected through a non-return valve to a pressure accumulator, which takes up part of the fluid escaping from the cylinder, and through a throttle valve to a deceleration regulator, which incorporates a flywheel carried round by a relative-motion sensor, as well as a component exerting a force in opposition to any gain by the flywheel in relation to the relative-motion sensor, up to a predetermined deceleration value, in addition to a cut-off acting in conjunction with the flywheel on the fluid that flows through the regulator at increasingly reduced pressure until the prescribed deceleration value is reached, the pressure of the fluid remaining constant for further braking once the cut-off has been closed by the flywheel. The relative-motion sensor in the deceleration regulator may with advantage comprise a spindle rotating at an angular velocity equivalent to the relative speed of the parts moving in relation to each other, which spindle is suitably mounted coaxially with both ends free to rotate in a cylindrical casing and may carry the flywheel that rotates within that casing, the flywheel preferably being driven round with the spindle by a carrier fitted between spindle and flywheel and being capable of relative motion through a limited angle in relation to the spindle in opposition to the said component (preferably a spiral spring) exerting a force between spindle and flywheel. The cut-off acting in conjunction with the flywheel may well be a rotary valve consisting of a circular valve body, which rotates on the spindle and is linked to the flywheel and which contains radial passages, and a section of the spindle containing preferably one coaxial passage and a number of radial passages in communication therewith, these radial passages being aligned with those in the circular valve body so as to allow the fluid to pass when the cut-off is opened, whereas the valve body closes the passages in the spindle when the flywheel gains on the spindle in opposition to the action of the spiral spring.

The spiral spring acting between spindle and flywheel is appropriately pre-stressed, the degree of pre-stress permitting determination of the degree of deceleration.

Further features, details and advantages of the invention will become apparent from the patent claims, the descriptive text and the accompanying drawings, in which one form of the invention is shown solely by way of example and in which:

FIG. 6 is a longitudinal section of a modified form of deceleration regulator; and FIGS. 7, 8 and 9 are various cross-sections of the deceleration regulator, taken along the lines D—D, E—E and F—F in FIG. 6.

The following description has to do with a spring-loaded cumulative brake for a track-bound ropeway. The braking system can be used in principle, however, for all kinds of vehicles and drives on aerial and track-bound ropeways, whether in the form of a spring-loaded cumulative brake or of a directly acting hydraulic brake.

Figure 1:
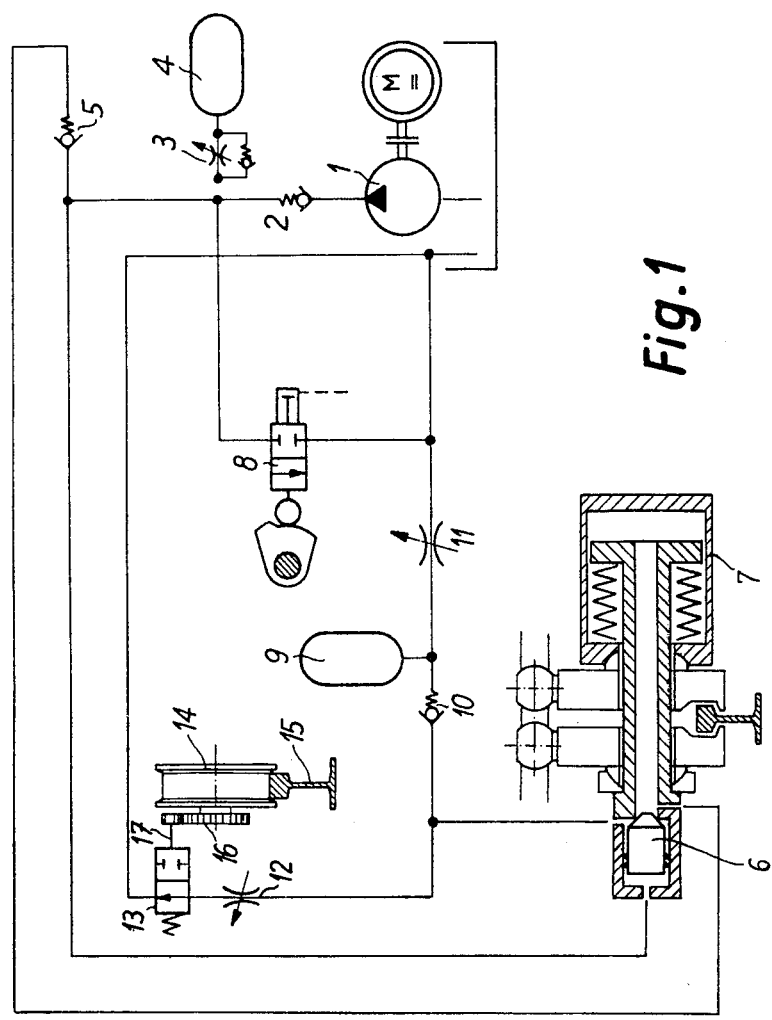
FIG. 1 is a layout of the hydraulics of the braking system for a track-bound vehicle.
Figure 2:
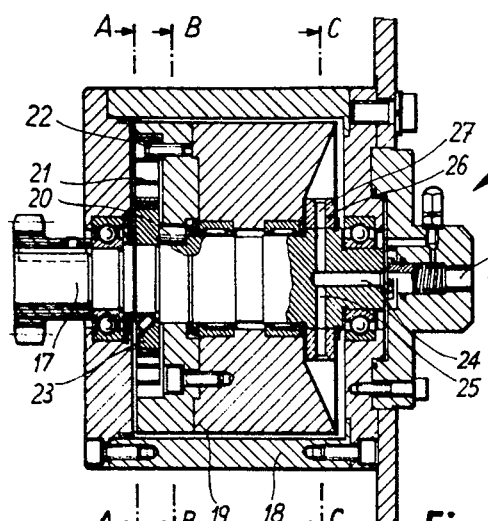
FIG. 2 is a longitudinal section of the deceleration regulator forming part of the braking system.
Figure 3:
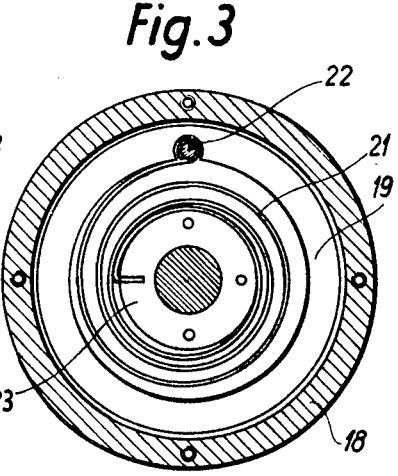
FIGS. 3, 4 and 5 are various cross-sections of the deceleration regulator, taken along the lines A—A, B—B and C—C in FIG. 2.

In the braking system shown in FIG. 1, a motor pump, 1, feeds oil under pressure to a spring-loaded accumulating cylinder, 7, several of which are fitted to a vehicle. The oil passes through a non-return valve, 2, and in the first instance a preliminary pressure valve, 5, ensures that the feed is applied to a brake valve, 6, on the spring-loaded cylinder and thereby closes it. The oil is thereupon enabled to pass te preliminary pressure valve 5 and reach the cylinder 7, the pressure applied to which takes the brake off by removing the spring pressure. At the same time, a pressure accumulator, 4, is charged, in order that possible leakage losses may be made good through a non-return throttle valve, 3. The braking system is then ready for action.

To apply the brake, an operating valve, 8, acted upon by the same oil pressure, is tripped. This can be done by hand or by an excess-speed switch or again by any emergency brake handle in the vehicle, or even automatically by the snapping of the rope, when the braking system is being used in an aerial ropeway. The tripping of the operating valve 8 relieves the pressure on the brake valve 6, since the oil under pressure can return to the pump through the operating valve 8. Each of the spring-loaded cylinders 7 is associated with a pressure accumulator, 9, to which the oil under pressure can now escape — the brake valve 6 having been opened — by way of a non-return valve, 10, the pressure falling. Each accumulator 9 contains a gas under pressure, which opposes the pressure of the oil, so that the gas pressure determines the initial braking power and hence the initial deceleration of the vehicle, since the oil pressure acting in opposition to the spring in the cylinder 7 can fall only until it balances that of the gas in the accumulator 9. The pipe leading back to the pump from the accumulator 9 is intercepted by a throttle valve, 11, the purpose of which is to maintain the pressure during this initial braking.

Branching from the pipe that joins the brake valve 6 to the accumulator 9 is another pipe, through which the oil under pressure passes, by way of a throttle valve, 12, to a deceleration regulator, 13, the oil flowing through this until a pre-determined degree of deceleration is reached, the pressure within the spring-loaded cylinder continuing to fall so that the vehicle deceleration resulting from further braking increases to the predetermined value.

In the example of a track-bound vehicle illustrated here, one of the running wheels, 14, of the vehicle, as it rolls along the rail 15, acts through a pair of gearwheels, 16, to drive a spindle, 17, and constitutes the relative-motion senser of the deceleration regulator 13, which halts the reduction in oil pressure when a prescribed deceleration has been reached, so that the braking force no longer increases.

In the deceleration regulator 13 shown in detail in FIGS. 2 to 5, the spindle 17 is mounted coaxially in a cylindrical casing, 18, with both ends free to rotate. A flywheel, 19, circular in cross-section, is mounted on this spindle with freedom to turn through an angle of about 15° to 20° in relation to the spindle, the motion of which is communicated to it by a carrier, 20. Rotation of the flywheel in relation to the spindle is opposed by a spiral spring, 21, one end of which is fixed to the flywheel 19 by a threaded pin, 22, and the other to a disc, 23, which is secured against rotation relative to the spindle, the pre-stressed spring serving to keep the carrier bearing against the flywheel. For reasons of construction, the flywheel 19 consists, as can be seen from FIG. 2, of two parts bolted together.

Figures 4, 5:
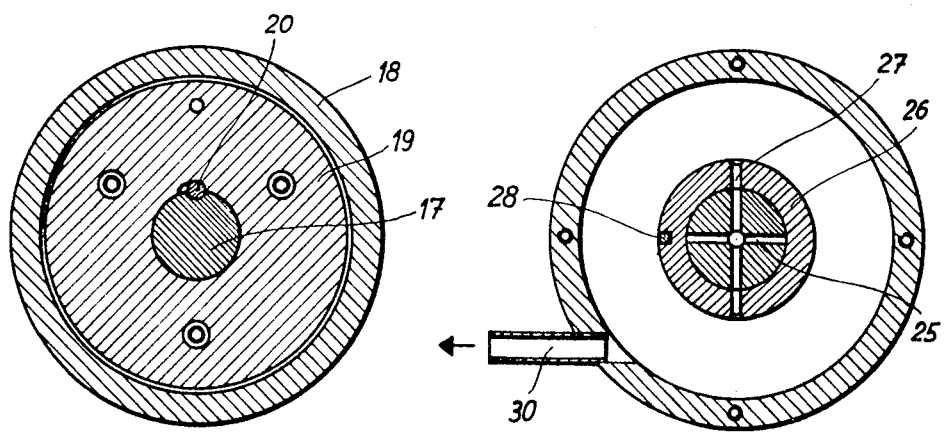

One end of the spindle 17 contains a blind hole, 24, drilled along its longitudinal centre line, in communication with four passages, 25, drilled radially in the spindle and spaced 90° apart. On this section of the spindle, a ring-shaped valve body, 26, containing two diametrically opposite radial passages, 27, is mounted with freedom to rotate so that the radial passages in the spindle and the valve body can be brought into alignment. As FIG. 5 shows, the valve body 26 is coupled to the flywheel 29 by a pin, 28. The spindle and the valve body together thus constitute a rotary valve; and as long as the spindle and flywheel turn at the same speed, the oil entering the casing under pressure through an inlet (29 in FIG. 2) flows through the passages in the spindle and valve body, leaving the casing again through a pipe, 30, connected to the latter. This enables the pressure of the oil in the spring-loaded cylinder of the braking system to continue falling. Because of the resultant increase in deceleration, there is produced between the flywheel 19 and the spindle 17 an increasing force acting in opposition to the spiral spring 21 and leading to rotation of the valve body 26 (coupled to the flywheel) in relation to the spindle 17, which rotation closes the rotary valve. This halts the continuing fall in oil pressure, further braking taking place at the pressure then prevailing inside the spring-loaded cylinder. The pre-stressing of the spiral spring 21 determines the degree of deceleration.

To prevent the valve body 26 from being loaded one-sidedly when the rotary valve is closed, thereby undergoing deformation, the spindle 17 contains four passages distributed uniformly round the circumference, though only two of these come into alignment with the passages in the valve body. In the example of the braking system described here, which is being used in a vehicle, four spring-loaded cylinders are provided, each of which operates the means of braking in the form of jaws forced against the rail from both sides, and an accumulator is provided in the vicinity of each cylinder. As regards the other components, the system has one deceleration regulator, but only the one pump and one of each of the other units are provided.

A modified form of deceleration regulator is shown in FIGS. 6 to 9. The aim of a regulator so modified is to make it possible to keep a constant check on whether the deceleration regulator, as the most important component in the braking system, is functioning properly; and when faults of any nature develop, it must be possible to indicate their presence, for which purpose it is proposed that an indicator be provided in a position remote from the deceleration regulator itself — in the driver's cabin of the vehicle, for instance. If, when the brakes are applied, the vehicle is decelerated and relative motion takes place between flywheel and spindle, this relative motion indicates that the deceleration regulator is functioning correctly and that the cut-off for the oil flowing through the regulator when the prescribed deceleration has been reached is closed. With a cut-off in the form of a rotary valve, however, as used in the deceleration regulator shown in FIGS. 2 to 5, it is scarcely possible for movement of the cut-off to be transmitted from the regulator to the outside and used for indication purposes. For the purpose of outside transmission and indication, therefore, the rotary motion needs to be converted into axial motion, as is done in the deceleration regulator now to be described.

In other respects, the deceleration regulator illustrated in FIGS. 6 to 9 acts in the same way as the one described previously. In the regulator here numbered generally 113, a spindle, 117, is mounted with both ends free to rotate in a cylindrical casing, 118. A flywheel, 119, is mounted on this spindle 117 with freedom to turn through an angle of about 15° to 20° in relation to the spindle, the motion of which is communicated to it by a carrier, 120. Rotation of the flywheel in relation to the spindle is opposed by a spiral spring, 121, one end of which is fixed to the flywheel 119 by a threaded pin, 22 (FIG. 7), and the other to a disc, 123, which is secured against rotation relative to the spindle, the pre-stressed spring serving to keep the carrier bearing against the flywheel.

Up to a prescribed deceleration value, determined by the pre-stressing of the spiral spring, the pressure fluid (oil, for example) is required to flow through the deceleration regulator, and then, as soon as the deceleration value is exceeded, the gain of the flywheel on the spindle must close a cut-off, halting the escape of oil from the brake cylinder so that the braking force no longer increases. In this deceleration regulator, the cut-off operated by the flywheel gain relative to the spindle is a piston valve consisting of a piston, 125, which moves axially in a coaxial bore, 124, in the spindle, 117, and inlet and discharge ports, 127 and 128, arranged radially in a valve housing, 126, for the pressure fluid, and a cylindrical piston seating, 129. The valve housing 126 associated with the regulator is flanged on to the regulator casing 118. Through various linkages, the piston 125 derives its motion from the flywheel 119, so that relative motion between the flywheel and spindle produces longitudinal motion of the piston. These linkage members consist of a ring, 130, mounted with freedom to slide longitudinally on the spindle 114 and bearing two diametrically opposite pins, 131, each of which engages radially, through a slot, 132, in the spindle 117, with a peripheral groove, 133, in the piston 125. The preipheral groove 133 is a continuous curve, but has a slight pitch of, for example, 0.3 mm., so that the pins of the ring rotating with the spindle, as they engage in the peripheral groove, impart oscillatory motion to the piston, to prevent frictional adhesion thereof. The ring 130 also contains in its periphery a guide groove, 134, which runs obliquely or helically, and in which the two pins 135 anchored in the flywheel 119 engage radially. Should the flywheel 119 gain on the spindle 114, that is to say if relative motion should arise between them, the ring 130 undergoes longitudinal movement, axially in relation to the regulator, carrying with it the piston 125 by engagement of the pins 131 in the peripheral groove in the piston. The short oscillatory motion for preventing friction adhesion of the piston continues the whole time the flywheel and spindle are rotating in step, whereas the longitudinal movement of the piston 125, which results in cutting off the flow of oil through the ports 127 and 128 in the valve housing, takes place only when there is relative motion between the flywheel and spindle, as arises during deceleration of the vehicle.

The longitudinal movements of the piston 125 can now be used to operate a tell-tale switch, 140, fitted adjacent to the valve housing 126 in another housing, 141, flanged on to the latter, the free end of the piston 125 serving as the switch operating member. The tell-tale switch 140 used here may be, for example, an electrical switch in circuit with an indicator (not shown) situated, for instance, in the driver's cabin.

It is thus possible to indicate that the regulator is in working order or, on the contrary, that a fault has developed in it; for example, should the spring between the spindle and flywheel break, leaving the position of the flywheel no longer defined in relation to the spindle, this would be revealed at once by operation of the tell-tale switch owing to longitudinal movement of the piston.

Another supervisory device consists of magnets, 143, fitted into one end face of the flywheel, so as to move past a magnetic switch, 144, fitted in the regulator casing 118, as the flywheel rotates. This enables a check to be kept on the rotation of the flywheel, which is essential for the functioning of the braking system. Thus, for example, assuming the spindle 117 to be driven by a wheel running along on the cable supporting a ropeway, if that wheel should become iced-up and no longer able to turn, the magnetic switch would provide an indication that the deceleration regulator was incapable of performing its task in the braking system.

It is possible to achieve a given nominal deceleration based on the extent to which the spiral spring 121 is pre-stressed. To alter the pre-stress on the spring, the position of one of the anchored ends of the spiral spring must be changed in relation to that of the other end. For this reason, that end of the spindle 117 which is adjacent to the disc 123, in which the end of the spring is anchored, is provided with notches or teeth which, in conjunction with matching teeth on the disc 123, enable the end of the spring to be fixed in various positions.

What I claim is:

1. A braking system for the braking of one part which is moving relative to another part, of the type including a brake cylinder which is charged with a fluid under pressure when the brake is off and which is relieved of pressure for braking purposes, the system comprising a pressure accumulator connected with the brake cylinder through a nonreturn valve to take up part of the fluid escaping from the cylinder, the accumulator containing a gas under pressure, the pressure of which gas determines the value of the initial braking force, and a deceleration regulator, a throttle valve connecting said deceleration regulator with the cylinder, the deceleration regulator including a casing, a cut-off valve, a flywheel rotatably mounted in said casing on a spindle which is driven by an axle of the moving part, means coupling said flywheel and spindle which allow overrunning of the flywheel with respect to said spindle to cause the cut-off valve to stop the passage of fluid through the regulator when a predetermined deceleration value is reached, and a spiral spring in the regulator having one end fixed to the flywheel and the other to the spindle and exerting a force in opposition to overrunning of the flywheel up to the predetermined deceleration value which is defined by the degree of prestress on the spiral spring.

2. A braking system as claimed in claim 1, in which the cut-off acting in conjunction with the flywheel is a rotary valve consisting of a circular valve body, which is rotatable on said spindle, means securing said valve body to the flywheel for rotation therewith, said valve body having radial passages therethrough, a section of the spindle containing one coaxial passage and a number of radial passages in communication therewith, these radial passages being aligned with those in the circular valve body so as to allow the fluid to pass when the cut-off is opened, the valve body closing the passages in the spindle when the flywheel gains on the spindle in opposition to the action of the spiral spring, said casing being provided with an outlet connected with a pipe, for the exit of the pressure fluid from the deceleration regulator when the cut-off is opened.

3. A braking system as claimed in claim 1, in which the cut-off acting in conjunction with the flywheel on the pressure fluid flowing through the regulator is a piston valve consisting of a piston, which moves axially in a coaxial bore in the spindle, and inlet and discharge ports arranged radially in a valve housing having a cylindrical piston seating; the piston deriving its motion from the flywheel through linkage members consisting of a ring mounted with freedom to slide longitudinally on the spindle and bearing at least one pin, which engages radially in a peripheral groove in the piston, the ring also containing in its periphery a helical guide groove, at least one pin fixed to the flywheel and engaging in the guide groove, in order to convert the rotary motion of the flywheel when, in opposition to the spiral spring acting between spindle and flywheel, it gains on the spindle, into motion of the valve piston, for the purpose of closing the cut-off.

4. A braking system as claimed in claim 3, in which the free end of the valve piston of the cut-off serves as the operating member for a tell-tale switch, which checks the position of the valve piston and is connected to an indicator.

5. A braking system as claimed in claim 3, in which the peripheral groove in the piston of the piston valve is a continuous curve having a pitch of, for example, 0.3 mm., so that the pin of the ring rotating with the spindle, as it engages in the peripheral groove, imparts oscillatory motion to the piston, to prevent frictional adhesion thereof.

6. A braking system as claimed in claim 1, in which the cylinder is a spring-loaded accumulating cylinder, including a pump for charging said cylinder with oil for taking the brake off, which cylinder, when relieved of pressure, operates the means of braking, said cylinder having an outlet, a brake valve for closing said outlet which brake valve is like-wise operated by said oil pressure means connecting said brake valve to an operating valve subjected to the same oil pressure, operation of the said latter valve serving to relieve the pressure acting on the brake valve.

7. A braking system as claimed in claim 6, in which said one part is a vehicle, which is moving relative to rails, and in which the vehicle is provided with four spring-loaded accumulating cylinders for applying the brakes to the rails and with four pressure accumulators associated with the said cylinders and containing gas under pressure, as well as one deceleration regulator, one operating valve and one pump.

* * * * *